United States Patent
Cioffi et al.

(10) Patent No.: US 9,241,077 B2
(45) Date of Patent: Jan. 19, 2016

(54) METHOD AND APPARATUS FOR DSL PERFORMANCE ENHANCEMENT IN A DSL NETWORK

(75) Inventors: John Cioffi, Atherton, CA (US); Mark Flowers, Los Gatos, CA (US); Mark Brady, Stanford, CA (US); Ardavan Maleki Tehrani, Menlo Park, CA (US); Marc Goldburg, Redwood City, CA (US); George Ginis, San Mateo, CA (US); Peter Silverman, Evanston, IL (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 0 days.

(21) Appl. No.: 13/376,742

(22) PCT Filed: Jul. 1, 2009

(86) PCT No.: PCT/US2009/049413
§ 371 (c)(1),
(2), (4) Date: Feb. 2, 2012

(87) PCT Pub. No.: WO2011/002459
PCT Pub. Date: Jan. 6, 2011

(65) Prior Publication Data
US 2012/0134397 A1    May 31, 2012

(51) Int. Cl.
*H04M 11/06* (2006.01)
*H04L 12/28* (2006.01)
*H04L 12/24* (2006.01)
*H04M 3/30* (2006.01)

(52) U.S. Cl.
CPC ......... *H04M 11/062* (2013.01); *H04L 12/2856* (2013.01); *H04L 41/0823* (2013.01); *H04L 41/142* (2013.01); *H04M 3/304* (2013.01)

(58) Field of Classification Search
CPC .......... H04N 21/442–21/4425; H04B 1/1027; H04B 3/32
See application file for complete search history.

(56) References Cited

U.S. PATENT DOCUMENTS

2006/0198430 A1   9/2006   Rhee et al.
2006/0280235 A1   12/2006  Rhee et al.
(Continued)

FOREIGN PATENT DOCUMENTS

JP   2008543244   11/2008
JP   2009500986   1/2009
(Continued)

OTHER PUBLICATIONS

ISR and Written Opinion for International Application No. PCT/US2009/049413 Mailed Mar. 1, 2010, 13 Pages.
(Continued)

*Primary Examiner* — Pao Sinkantarakorn
(74) *Attorney, Agent, or Firm* — Green, Howard & Mughal, LLP (57) ABSTRACT

A Digital Subscriber Line (DSL) Management Center (DMC) coupled to a DSL network includes a data collection module that receives information regarding the DSL network from a plurality of sources. An analysis module is coupled to the data collection module to analyze the received information and issue a command for one or more of a plurality of DSL performance enhancement devices to optimize their operation. A command signal generation module is coupled to the analysis module to receive the issued command from the analysis module and generate a corresponding command signal for transmission to one or more of the DSL performance enhancement devices.

19 Claims, 6 Drawing Sheets (56) References Cited

U.S. PATENT DOCUMENTS

2007/0002758 A1 1/2007 Blackburn et al.
2007/0283401 A1* 12/2007 Lee et al. .................... 725/107
2008/0089239 A1* 4/2008 Todd et al. .................. 370/252

FOREIGN PATENT DOCUMENTS

| WO | WO-2006131791 | | 12/2006 | |
|---|---|---|---|---|
| WO | WO-2006131794 | | 12/2006 | |
| WO | WO2007130879 | * | 11/2007 | |
| WO | WO 2008/016585 | * | 2/2008 | .............. H04B 3/46 |

OTHER PUBLICATIONS

ISR and Written Opinion for International Application No. PCT/US2009/049413 Mailed Apr. 26, 2010, 11 Pages.
International Preliminary Report on Patentability for International Patent Application No. PCT/US2009/049413, Mailed Jan. 12, 2012.
Non-Final Office Action European Patent Application No. 09790028.6, Mailed Oct. 9, 2012.
Non-Final Office Action for Japanese Patent Application No. 2012-518520, Mailed Nov. 12, 2013.
Non-Final Office Action for Chinese Patent Application No. 200980160258.5, Mailed Nov. 15, 2013.
Second Office Action for Chinese Patent Application No. 200980160258.5, mailed Jul. 15, 2014.
Notice of Allowance for Japanese Patent Application No. 2012-518520, mailed Aug. 5, 2014. (No English translation available).
First Examination Report for Australian Patent Application No. 2009348906, mailed Jan. 13, 2015.
Third Office Action for Chinese Patent Application No. 200980160258.5, mailed Mar. 11, 2015.

* cited by examiner

METHOD AND APPARATUS FOR DSL PERFORMANCE ENHANCEMENT IN A DSL NETWORK

CROSS-REFERENCE TO RELATED APPLICATION

This patent application is a U.S. National Phase application under 35 U.S.C. §371 of International Application No. PCT/US2009/049413, filed Jul. 1, 2009, entitled METHOD AND APPARATUS FOR DSL PERFORMANCE ENHANCEMENT IN A DSL NETWORK.

BACKGROUND OF THE INVENTION

1. Field of the Invention

An embodiment of the invention relates to the field of DSL (Digital Subscriber Line) communications, and in particular, a management system to enhance performance, for example, by reducing noise interference, in a DSL network.

2. Description of Related Art

The world market for DSL services presently exceeds 300 million lines, and continues to grow. Many of the DSL lines in operation today are limited in the rate of their transmission by the noise levels received by the customer's modem. The sources of such noise are numerous; they enter the DSL line either within the operator's plant or within the customer's home, and may either be stationary, intermittent, or impulsive in nature. Typical sources of noise are combinations of such common sources as DSL crosstalk, AM radio signals, television set interference, lighting, washing machines, alarm systems, and other appliances. The characteristics of noise on a given line may change over time as various noise sources are energized or disabled or with the level of energization or characteristics of the propagation path between the source and the line, such as in the variation with time of AM radio broadcast power levels.

In some cases, received noise on the line impairs not only the rate of data transmission, but the quality of the service (QoS) as perceived by the customer. This distinction has become more important as the services delivered over DSL have changed in recent years. While DSL has traditionally been used for transmission of best-effort packet data (email, Internet, instant messaging), which is relatively insensitive to transient packet errors, new applications transported over DSL such as IPTV may be highly sensitive to transient degradations caused by e.g. impulsive noise.

In current practice, DSL line noise is generally dealt with by reducing data rate, which makes the DSL service less sensitive to noise, and not by actively removing or canceling noise on the DSL line. In the present art there are certain devices that attempt to cancel specific types of noise on a DSL line. These embodiments are limited in that they attempt to cancel noise independently; they cannot be centrally managed, do not make use of external information (such as diagnostic information on the line, historical line noise environment and performance, configuration of the telephone cabling), and are not configurable to reflect users' performance preferences. Improved practice may also involve a significant computational capability that would not be practical or cost-effective to locate in every DSL customer's cancellation apparatus. Such complexity could become cost effective if shared over many customers by a central control system. Further, a central computational device would enjoy the benefit of statistical knowledge collected from other DSL connections and cancellations that would benefit the level of improvement on the line presently under direct assistance.

A system or device that can improve DSL network performance through the control and management of DSL line noise across the entire network using a centralized command interface to manage equipment at the subscribers' premises represents a novel technical advance over present art. The technical advance is relevant to practice because DSL operational issues such as capital costs, operating costs, and services that can be practically offered to customers are driven significantly by the performance of the physical-layer DSL devices. This performance, in turn, depends strongly on DSL line noise.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION OF THE INVENTION

Figure 1:
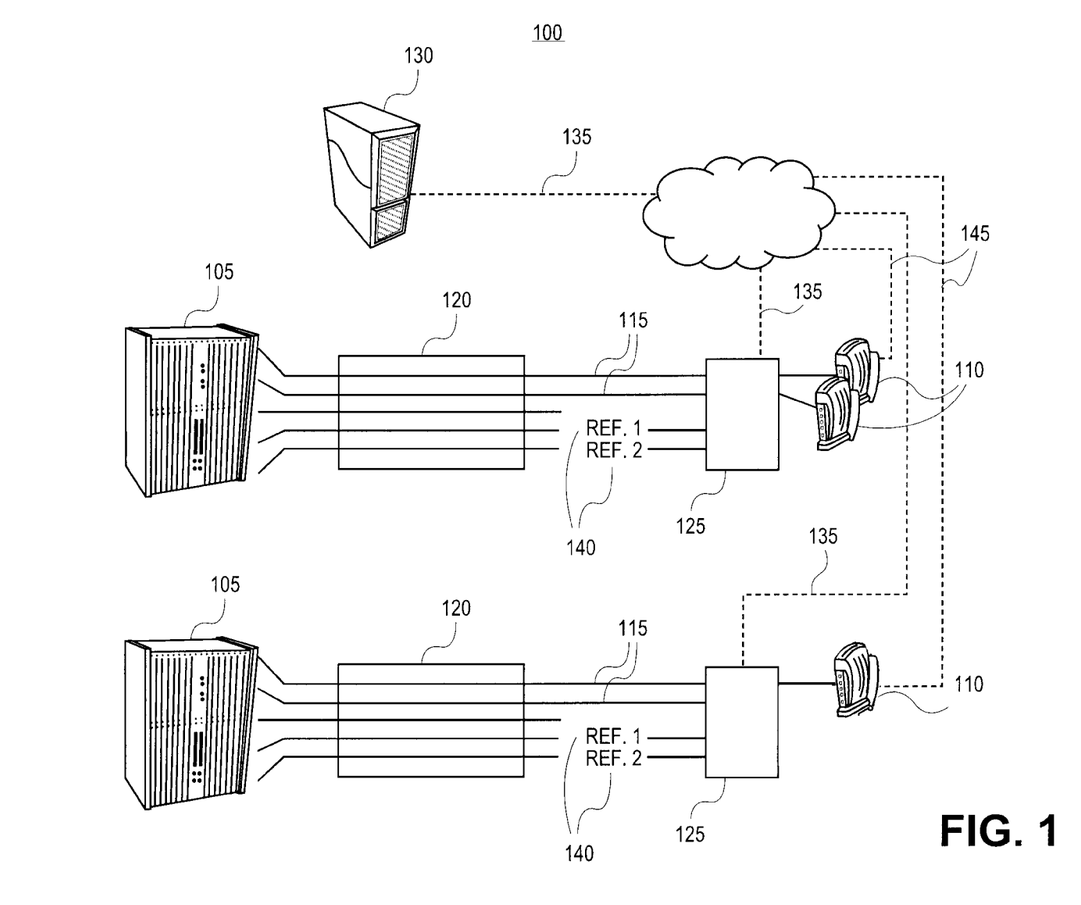
FIG. 1 illustrates a DSL network in which an embodiment of the invention operates.

One embodiment 100 of the system of this invention is illustrated in FIG. 1. In this embodiment, a data-to-DSL multiplexer 105 (such as a DSL Access Multiplexer (DSLAM), remote terminal (RT), line terminal (LT), or similar device) is located within a central office (CO) of a DSL service operator, a remote terminal (RT) of a DSL service operator, a pedestal of a DSL service operator, or within a multi-occupancy property. The data-to-DSL multiplexer is communicatively coupled to one or more DSL modems 110 located within customer premises for the purpose of digital data transmission. The data-to-DSL multiplexer and each DSL modem are physically connected via a copper twisted-pair cable 115, herein referred to as a "DSL line", a plurality of which may be grouped into multi-pair cables and/or bundles thereof, herein referred to as "binders", within the carrier's loop plant or multi-residence property, as illustrated with reference to 120 in FIG. 1.

Placed in between the data-to-DSL multiplexer and the one or more DSL modems are performance enhancement devices 125. A performance enhancement device may comprise a signal conditioning device, a diagnostic and remedy guidance device, or a noise cancellation device. A noise cancellation device, among other things, acts to cancel noise and interference present on the DSL line, either autonomously or in conjunction with commands from a DSL Management Center (DMC) entity 130. The DMC 130 could be significantly different than those typically defined in various Dynamic Spectrum Management (reference) and DSL management (G.ploam or G.997.1, reference) standards because it may improve or manage the characteristics of the DSL line itself rather than the just the DSLAM or the Modem. Thus, the term "DMC" is used more generally here and does not necessarily correspond to the devices sometimes described in various standards' groups documents. Cancelling DSL line noise improves the performance of each line in the network and thus the overall network performance. The performance enhancement device 125 is logically communicatively coupled to a DSL Management Center through a communication network via any of a number of paths 135 such as: the public switched telephone network (PSTN) effectively calling the DMC over a phone connection (analog POTS), a packet transfer over the DSL line 115 between the Data-to-DSL multiplexor 105 and the modem 110 as well as the internet or other network connection to the DMC, or over a wireless connection and other network connection to the DMC. It is appreciated that other communication methods, such as cellular data communications, Broadband Forum TR69, electronic mail communications, and flash memory, could also be used for communications back and forth between the DMC and the performance enhancement devices. The performance enhancement device is also connected to one or a plurality of reference signals, denoted "Ref(s)" 140 in FIG. 1, to be used for estimating and cancelling the line noise on the DSL line 115. The reference signals may be, for example, an unused copper pair in the customer's drop cable, an unused pair in the Operator's binder, an antenna, a common-mode signal on the DSL line, or a stored signal that may have been previously observed on the line or references and/or supplied to the performance enhancement device 125 by the DMC 130. In an alternate embodiment of the system, the performance enhancement device 125 may be integrated into the Modem device 110 (or possibly the Data-to-DSL multiplexor device 105).

The DSL Management Center (DMC) 130 is a system comprised of hardware, software, servers, memories, databases, terminals, and output devices. Each DMC 130 communicates with a plurality of performance enhancement devices 125 over one of the above-referenced paths (such as path 135 illustrated in FIG. 1). The performance enhancement devices 125 may themselves be connected to different data-to-DSL multiplexers 105, different binders 120, possibly owned by different DSL operators, or any combination thereof. In one embodiment, the DMC 130 may also communicate directly to modem(s) 110 within the customer premises (as illustrated by lines 145 in FIG. 1). The DMC 130 controls the operation of the performance enhancement devices 125, collects data from the performance enhancement devices, and provides a user interface for the DMC. This user interface enables the operator and/or end-users to manage and monitor DSL network performance by providing visibility into such performance values and/or analysis statistics such as DSL line noise, DSL line-noise source statistics (AM frequencies, T1 statistics, etc.), DSL line stability, DSL line performance statistics, DSL performance trouble reports (generated by users or customer-premises equipment), DSL data transmission rates, higher-layer protocol information collected from a home network (e.g., TCP error rates from a home router), and the degree of noise reduction accomplished by noise cancellation. The DMC 130 may be integrated into the Operator's network, or may be operated by a separate entity. Further detail of the architecture of DMC according to one embodiment of the invention is provided in FIG. 2.

Figure 2:
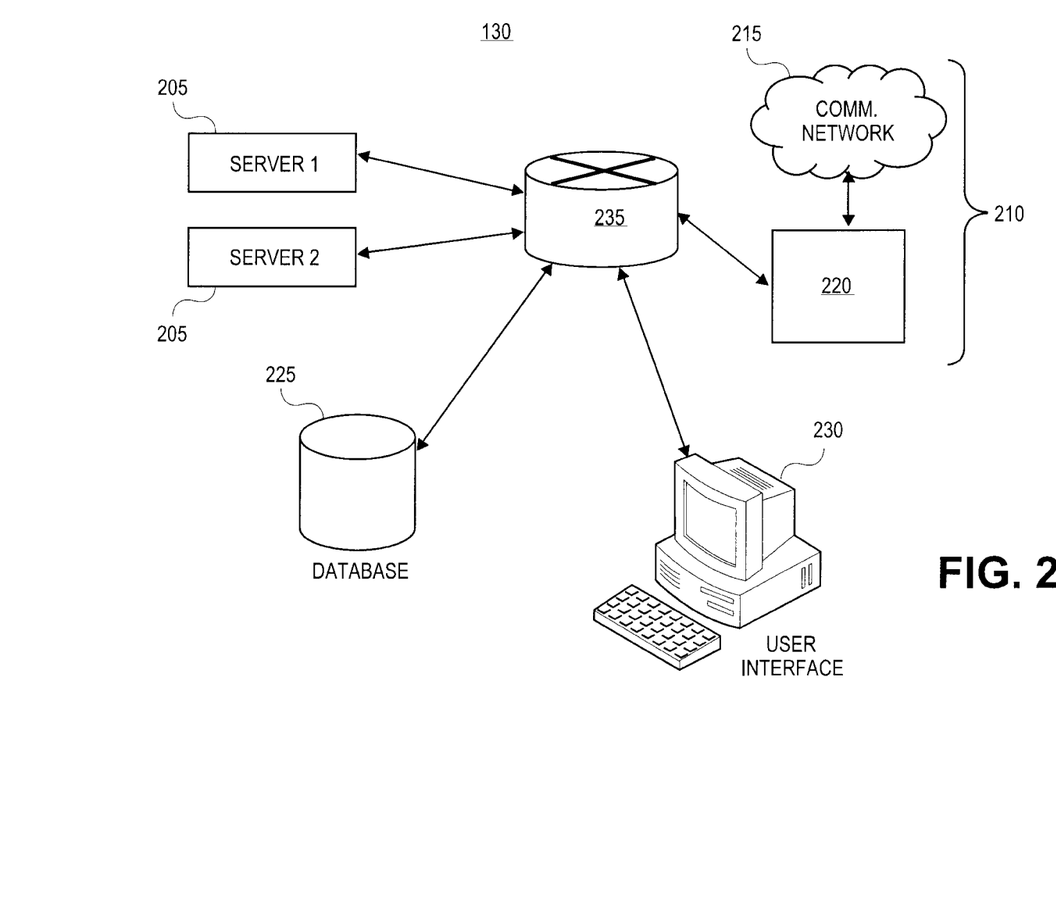
FIG. 2 illustrates aspects of an embodiment of the invention.

Within the embodiment of the DMC 130 illustrated in FIG. 2, a single server 205 or multiplicity of servers (which may be generic computer server hardware or of specialized design) are situated as illustrated in the Figure. The servers 205 may create and/or receive communicative connections with the deployed performance enhancement devices 125 through any of a variety of communication means 210: the servers may connect to or be contacted by the performance enhancement devices 125 through the Public Switched Telephone Network (PSTN) 215, the connection to which may be intermediated by a Plain Old Telephone Service (POTS) gateway/phone bank 220, or a communication network such as the Internet, including Internet connections provided by the DSL lines 115 being managed by the DMC 130, or cellular data communication means may be used to form or receive connections with the performance enhancement devices 125. The link between performance enhancement devices and the DMC can be continuous or may be regularly or irregularly connected and could even include manual porting of data from the performance enhancement device 125 to the server 205. The servers 205 are connected to a database 225 in which historical data, state information, performance results, reports, and similar information may be stored and accessible by the servers within the DMC 130. One or a plurality of the servers host a "DMC Operator graphical user interface (GUI) and/or northbound application programming interface (NAPI)" service for input/output operations via a display and input device 230, and/or for communicating with other Operational Support Systems (OSSs) in one or more service provider's network.

The GUI and/or NAPI provide the operator of the DMC 130 and/or end users with the ability to configure, operate, and monitor the performance of the DMC, the performance enhancement devices 125, and performance of the DSL network, and further provide access to the above referenced performance enhancement and/or analysis statistics reports. This service may take the form of a web site (WWW, HTML), web service (XML) or other interface format known to those skilled in the art. In one embodiment, one or a plurality of the servers hosts an "end user graphical user interface (GUI) and/or northbound application programming interface (NAPI)" service. This service may take the form of a web site (WWW, HTML), web service (XML) or other interface format known to those skilled in the art. This service enables a plurality of end-users to access information from the DMC 130 by connecting to the DMC through a communication network such as the Internet, wireless data, or telephone. The information accessible by the end-users and their applications through the "End-user NAPI/GUI" is controlled and configured by the operator of the DMC server 205. "End-users" here includes DSL service providers and their customers.

FIG. 2 shows a switching fabric 235 used for communication between the servers and other DMC elements. However, in alternative embodiments the various elements may be connected by direct (point-to-point) links, in separate physical locations, behind firewalls or virtual private networks (VPNs), or a combination of the foregoing as known to those skilled in the art.

Operation of the DSL Management Center

Figure 3:
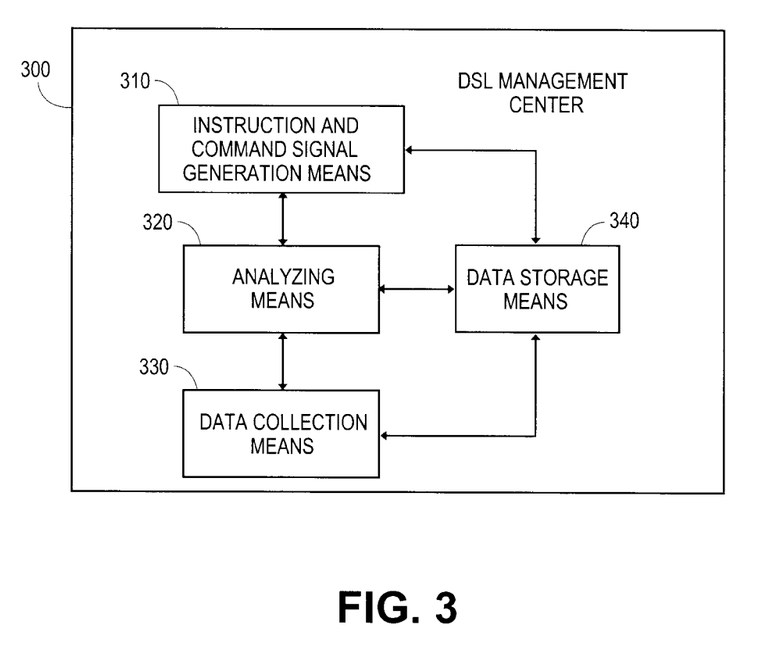
FIG. 3 illustrates a functional block diagram of a DSL management center in accordance with an embodiment of the invention.

According to an embodiment of the invention 300 shown in FIG. 3, the DSL Management Center (DMC) 130 comprises of an Instruction and Command Generation Means 310, an Analyzing Means 320 ("Analyzer"), a Data Collection Means 330 and a Data Storage Means 340. The DMC 130 could be an independent entity monitoring and controlling one or more performance enhancement devices as a controller, assisting users and/or one or more device operators, independent operators or providers in optimizing or otherwise controlling their use of the performance enhancement devices. (A DSL Management Center may also be referred to as a Controller, Management Entity, Network Management Server (NMS), Element Management Service (EMS), or the like).

Moreover, DMC 130 may be part of a cancellation system, in which the DMC 130 is connected to and/or controlling multiple performance enhancement devices. Likewise, components of DMC 130 may or may not be in the same location and/or equipment, and/or may instead be distributed in different locations and accessed as an element of the DMC.

In the exemplary system of FIG. 3, the analyzer 320 is communicatively connected to the data collecting means 330 (which also may perform diagnostic and performance monitoring, if desired) and Instruction and Command Generation means 310. The collecting and/or monitoring means 310 may be coupled to and may collect data through and from external sources, through a broadband network (for example, via the TCP/IP protocol or other means outside the normal internal data communication systems within a given DSL system). The DMC could communicate with the sources via any number of other communication systems, such as analog POTS, cellular data communications, wireless data communications, Broadband Forum TR69, internet data communications, electronic mail communications, flash memory, and DSL communication channels such as Operation, Administration, and Maintenance (OAM) and Embedded Operational Channel (EOC). Also, the collecting means 330 may have access to one or more databases or other sources 340 that store collected and analyzed information, as well as command signals, and which could be communicated with the modems or performance enhancement devices at an appropriate time.

Data may be collected once from a performance enhancement device (for example, during a single transceiver training) or over time. In some cases, the collecting and monitoring means 330 will collect data on a periodic basis, though it also can collect data on-demand, in real-time or on any other non-periodic basis, thus allowing the analyzer 320 to update its user, performance enhancement device, and cancellation data, if desired.

The data collection and monitoring means 330 may use different mechanisms for forming communicative connections for transmission of data to and from the performance enhancement devices, modems and users. The data collection means may use available analog POTS, cellular data, wireless data, Broadband Forum TR69, Internet data, email, sending a flash/memory, and other means of communication back and forth with the performance enhancement devices, modem and users.

Analyzing means 320 is capable of analyzing data provided to it to determine whether instructions need to be sent to one or more of the performance enhancement devices or modems to assist such in mitigating noise and interference effects. The analyzing means 320 is communicatively coupled to an instruction and command signal generating means 310 (or simply, "signal generator 310"). Signal generator 310 is configured to accept a parameter value generated by the analyzing means 320 for use by a performance enhancement device or modem, where the parameter value is based on the operational data and is calculated to assist the performance enhancement device in mitigating noise or interference, and improving stability, eliminating failures or reducing errors in the modem. The instruction and command signal generating means 310 may or may not be part of the analyzer 320 and/or be implemented in the same hardware, such as a computer system. Instruction and command signal generator 310 constitutes a means for regulating one or more parameter values in the performance enhancement devices.

Embodiments of the present invention can receive information regarding the DSL network from a plurality of sources, such as those mentioned above, as well as from a database, library or other collection of data pertaining to data collected (including user preference data, operational data, historical data regarding collected operational data and the like and other types of data), instructions and commands signals, etc. This collection of data may be stored, for example, as a library in the DMC controller of FIG. 3 and used by the analyzing means 320 and/or collecting means 330. An operator may also store library and/or database information outside the controller at a different location, from which the controller may access the data.

In some embodiments of the present invention, the DMC 130 may be implemented in one or more computers such as PCs, workstations or the like and/or in one or more computer program products. The collecting means 320 and analyzing means 330 may be software modules, hardware modules or a combination of both, as will be appreciated by those skilled in the art. When working with a large numbers of performance enhancement devices, modems, lines, users, etc., databases may be introduced and used to manage the volume of data collected.

In those embodiments of the performance enhancement device where the performance enhancement device functionality includes complete implementation or emulation of a DSLAM modem or xDSL Modem, the DMC controller of FIG. 3 sends commands and instructions to the performance enhancement device to control functionality related to the DSLAM/xDSL modem. These commands and signals include but are not limited to:
  power and margin control,
  coding and rate control,
  bit allocation control,
  fault diagnostics and resolution,
  modem physical layer parameter control (INP, delay, rate),
  line profiling In one embodiment of the invention, the modem is utilized as a content delivery means for a content delivery service, such as motion picture subscription service, streaming video service, internet television (IPTV) service, music subscription service, network gaming or entertainment service, or internet telephony (VoIP) service, etc. In this embodiment the modem could be a DSL enabled setup box, home networking device, or multimedia center, etc.

Figure 4:
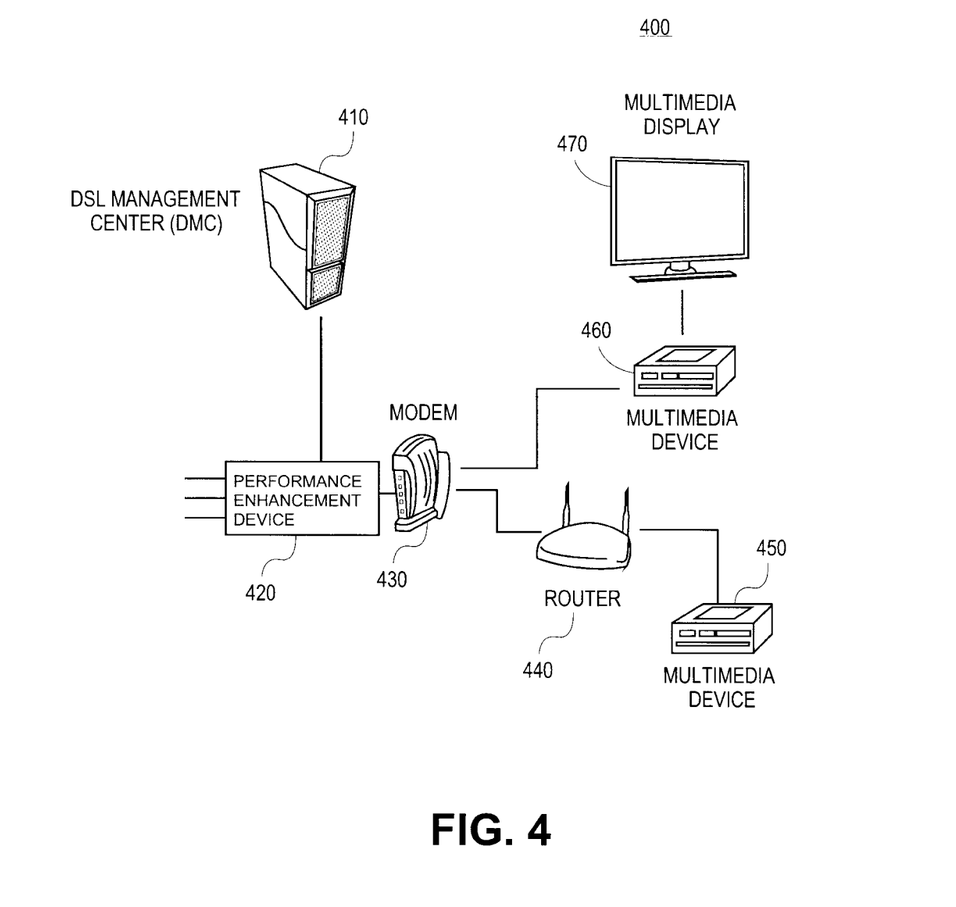
FIG. 4 illustrates a customer premises configuration in which an embodiment of the invention operates.

In an exemplary embodiment as shown in FIG. 4, the modem 430 could be connected to content delivery devices 450 and 460 directly or via a router 440. The content delivery devices could be connected to other multimedia delivery devices 470 such as a television, speakers, computers, etc.

In one embodiment of the invention, customers and users of the services provide to the DMC 410 input/feedback information regarding their use and preferences to services and quality thereof, such as desired data rates, levels of service including video, audio, or data quality, time of day preferences. The customer input/feedback information could be direct or indirect. The direct input is provided directly by the user via a communication link, via a web interface, internet, a phone connection, etc. The indirect input/feedback information could be provided by a content delivery service, such as motion picture subscription service, streaming video service, internet television (IPTV) service, music subscription service, network gaming or entertainment service, or internet telephony (VoIP) service, automated service monitoring probes at the customer premises, etc.

The user input/feedback information could also be obtained by assessing the level of user satisfaction based on user complaints (trouble tickets), made to the service providers, the independent operators or alike.

The user input data is analyzed at 320 to determine what necessary operational instructions need to be communicated with the corresponding performance enhancement devices.

For direct customer input, the customer feedback can be collected from a number of different interfaces. There could be a remote interface to the DMC 410. Furthermore, there could be an interface to the performance enhancement device 420, or there could be an interface to the modem 430.

In an exemplary embodiment, customer feedback is collected from the interface to an application device (such a remote controller or a PC). An example is real-time customer input provided by a TV remote control or similar input device where the user/viewer can indicate an instantaneous quality problem by selecting a 'trouble' or 'poor quality' button on the remote control, for example, when the customer perceives subjective degradation of an application, such as pixelization of a digital TV image. The remote control respectively has an interface communicatively connected to a DMC, a performance enhancement device, or a modem.

In an exemplary embodiment providing for an indirect user input, the real-time input is provided by the remote performance enhancement device and such input indicates the correlation in time between the time user/viewer's 'trouble' input in the remote performance enhancement device's calculations and processing.

Figure 5:
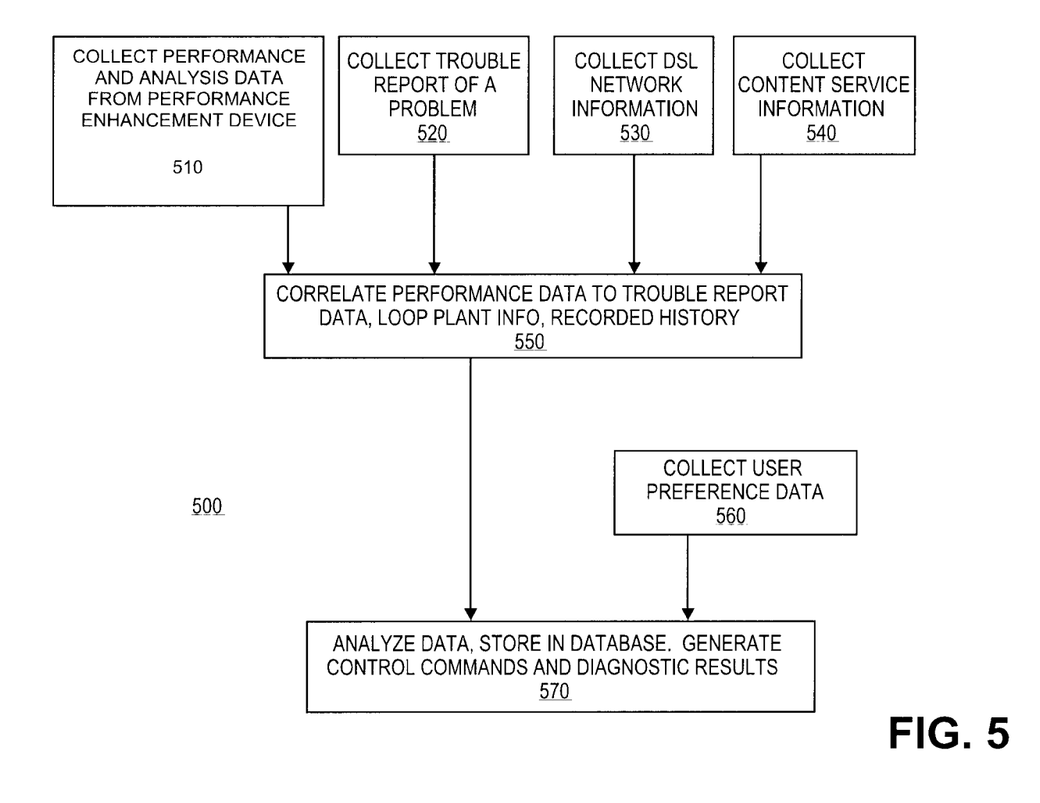
FIG. 5 illustrates a flow chart of a process in accordance with an embodiment of the invention.

FIG. 5 illustrates at 500 exemplary internal processing steps utilized by the DMC. The node 530 "Collect DSL Network Information", which corresponds to a Data Collection Means 330, indicates the gathering of information regarding the physical configuration of the Operator's network. Such information comprises copper twisted-pair cable length, cable gauge, distribution of other disturbers in the same binder, cable junction and routing information, and any impairment on the loop (bridged taps, bad splices, grounding faults, water in the cable, shorts, bad splices, and the like). This information may be furnished by the operator itself (e.g. through loop records, cable binder database, or subscriber address information), from the users themselves (address, billing record data, or user-entered configuration information), from a third party such as a regulatory agency or service wholesaling entity, or may be inferred from information provided by the performance enhancement device possibly in combination with the search of private or public data bases, for instance "Google Maps", or search engines.

The node 540 "Collect Content Service Information", which corresponds to a Data Collection Means 330, indicates the gathering of information from content delivery systems which, in the course of their operation, utilize the DSL connections under management of the DMC. Such content delivery systems may include, without limitation, motion picture subscription services, streaming video service services, internet television (IPTV) services, music subscription services, network gaming or entertainment services, or internet telephony (VoIP) services. Content service information refers to data characterizing the performance of the content delivery services that make use of the connection between the DSLAM and the modem. Without limitation, examples of such information are content delivery impairment tracking, content service usage history, content service trouble reports, and content service subscription parameters. Content delivery systems may be operated by the same Network Operator as the DSL line, or by third parties. Accordingly, content service information may be collected either from the Network Operator or from third-party operators of content services. Content service information may additionally be furnished by the end-users themselves.

The node 510 "Collect Performance and Analysis Data from Performance Enhancement Devices", which corresponds to a Data Collection Means 330, refers to the process of gathering data for subsequent analysis from a plurality of performance enhancement devices as shown in FIG. 1. One category of collected data comprises internal information from the performance enhancement devices (such as noise cancellation performance, filtering and mixing parameters, DSL line or reference line noise estimates, noise correlation estimates, or detected noise sources and their properties). A second category of information gathered comprises data, status, and information provided by other devices within the customer premises (such as computers, IPTV devices, VoIP devices, streaming audio devices, or devices used by content delivery services) that was collected by the performance enhancement devices. A third category of information comprises data, such as statistics, collected by actively probing any of the DSL line inputs 115, modems 110, or reference lines 140 of FIG. 1 by the performance enhancement devices through any enabling means such as single-ended loop testing (SELT), double-ended loop testing (DELT), time-domain reflectometry (TDR), or other techniques as known to those proficient in the art. The collected data includes user preference data, operational data, historical data regarding collected operational data and the like and other types of data. The operational data also includes the DSL service parameters, such as maximum Upstream and Downstream rate that the customer has paid for, and/or other DSL service related parameters.

The node 520 "Collect Trouble Report Data", which corresponds to a Data Collection Means 330, represents the process of gathering real-time indications of problems with DSL service or applications that make use of DSL service. Trouble report data comprises technical problems reported by an end-user (such as telephone calls to customer support center, or data from a dedicated trouble reporting device), alarm conditions, error conditions, performance flags, and other mechanisms for reporting of service trouble as are familiar to those knowledgeable in the art. Trouble report data may be gathered from a plurality of sources such as data automatically generated by the performance enhancement devices, user input to the performance enhancement devices, user input to other devices within the customer premises (such as set-top boxes, television remote controls, or VoIP phone service), data automatically generated by other devices within the customer premises, or data generated by a content delivery service. In some embodiments, the successful collection of trouble report data is indicated to the source from which it was collected by means of an acknowledgement message, for example, sent to the source by the performance enhancement device.

The node 550 "Correlate performance data to trouble report data, loop plant info, recorded history", which corresponds to an Analyzing Means 320, denotes the process of analyzing the correspondence, correlation, or association between trouble reports, user preference data, and historical performance data that is stored in the database 225 of FIG. 2. In one embodiment of this invention this step corresponds to deducing thresholds in the performance and analysis data that lead to trouble reporting by or on behalf of the user. In another embodiment of this invention, this step involves deducing correlations between trouble reports and all other sources of data. In yet another embodiment, this step involves examining correlations in the data over time in conjunction with the previously-described steps.

The node 560 "Collect User Preference Data" refers to the process of gathering input from the user of customer premises equipment 420, 430, 440, 450, 460, and 470 regarding desired operation of the same. Without limitation, examples of user preference data are: priorities that the user places between data carried on the DSL link (e.g. IPTV traffic is higher priority than WWW traffic), preferences relating to the delay on the DSL link (e.g. whether interactive gaming equipment in the customer premises requires a low-delay link, or whether VoIP devices are in use), preferences about which types of content delivery services are relevant to the user (e.g. whether the user is interested in high-definition (HTDV) IPTV service as opposed to standard-definition IPTV, whether the user is subscribed to a content delivery service that supports various bandwidth requirements, whether the subscriber's customer premises multimedia devices 450, 460 have the capability to receive high-definition audio or video). User preference data may be provided through a local user interface of a performance enhancement device, through a "User Interface" of a DMC as in FIG. 2 via direct customer communications (such as by postal mail, electronic mail, Internet, telephone, and the like) or through other means of customer communications as familiar to those proficient in the art. User preferences may also be inferred or assumed by the DMC operator or the DSL service provider.

The node 570 "Analyze Data, Store in Database, Generate Control Commands and Diagnostic Results" step entails first analyzing collecting data, which corresponds to an Analyzing Means 320. The analysis algorithms used in various embodiments to generate control commands and diagnostic results may be based on static characterization of the DSL line 115 input connection(s), their history, neighborhood, cable, general population, or observed dynamics. The generated control commands and diagnostic results are stored in the DMC's database 225 for subsequent access, which corresponds to a Data Storage Means 340.

Control commands that are generated refer to instructions, parameters, and/or settings that adjust the behavior and/or administratively enable/disable features of the associated performance enhancement devices, and correspond to the Instruction and Command Signal Generating Means 310. Some examples of adjusting the behavior of the performance enhancement device include, without limitation: specifying the parameters used by a successive cancellation algorithm, specifying the parameters used by a linear least-squares cancellation algorithm; identifying frequency bands in which to focus or concentrate noise cancellation behavior; identifying frequency bands in which to omit noise cancellation; specifying the inputs to use for cancellation; and specifying inputs to ignore for cancellation. These techniques for adjusting behavior of the performance enhancement device are dynamically adaptable, for example, in response to changes in the source of information, such as noise. Administrative enabling or disabling refers to turning on or off, or adjusting the provisioned level of performance for features of the performance enhancement device, such as its noise cancellation, or user-accessible features available through the performance enhancement device's local user interface. Some examples of Diagnostic Results include, without limitation, bad splice detection, bridged tap detection, impulse noise detection, split pair detection, identification or classification of noise and/or interference sources, Amateur Radio (HAM) detection, AM radio detection, HDSL detection, T1/E1 detection, high-power noise detection, bridged tap detection, unbalanced wiring detection, maximum data rate analysis, and forward error correction (FEC) analysis. Results of these algorithms are optionally stored in the DMC database for future or immediate reference.

Figure 6:
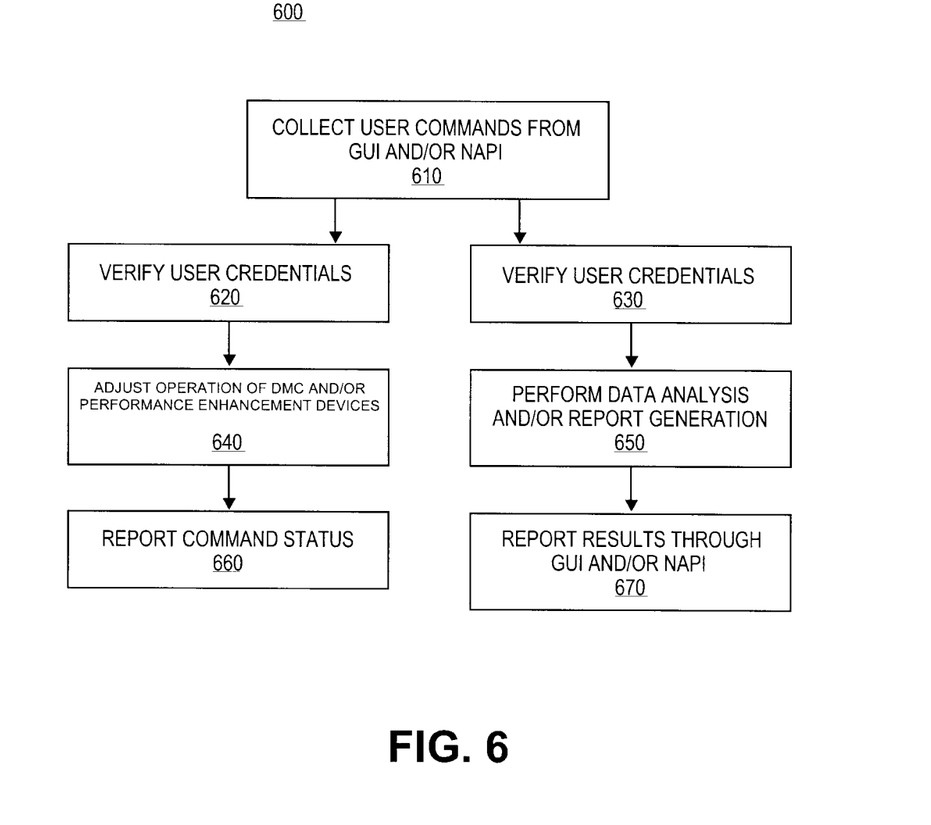
FIG. 6 illustrates a flow chart of a process in accordance with an embodiment of the invention.

In those embodiments of the performance enhancement device, where the performance enhancement device functionality includes complete implementation or emulation of a DSLAM modem or a xDSL Modem, the "Analyze Data, Store in Database, Generate Control Commands and Diagnostic Results" step 570 of FIG. 5 also entails sending commands and instructions to the performance enhancement device to control functionality related to the DSLAM/xDSL modem. These commands and signals include but are not limited to:
- power and margin control,
- coding and rate control,
- bit allocation control,
- fault diagnostics and resolution,
- modem physical layer parameter control (INP, delay, rate),
- line profiling FIG. 6 illustrates the process 600 of the DMC acting in response to user input from the GUI and/or NAPI interface.

Certain user commands available on the DMC permit the configuration and operation of the DMC. Examples of such configuration settings are user management, inventory management, provisioning control, performance enhancement device configuration settings (including enabling or disabling the operation of the performance enhancement device), and specification of parameters used in the DMC's analysis algorithms. When such user commands are received at 610 by the DMC, the credentials of the user issuing the commands are verified at 620 against a list of allowed users to determine whether the command should be accepted. If the command is accepted, the DMC makes changes to its operation or the operation of the performance enhancement devices in response to the specified command as represented by the "Adjust operation of DMC and/or performance enhancement devices" step 640. Finally, a response indicating the status of the command (e.g. whether it was successful or unsuccessful) is returned to the user in the "Report Command Status" step 660.

Certain user commands 610 available on the DMC permit the operator to receive information pertaining to the current performance, historical performance statistics, equipment behavior, data collected from performance enhancement devices, or recommended configuration settings of the DMC. This information may be in the form of raw data, processed data or reports. When user commands requesting such information are received at 610 by the DMC, the credentials of the user issuing the commands are verified at 620 against a list of allowed users to determine whether the command should be accepted. If the command is accepted, the procedure described in FIG. 5 may be initiated at 650 in order to generate results. Finally, results are furnished to the user as indicated in the "Report Results through GUI and/or NAPI" step 670.

What is claimed is:

1. A Digital Subscriber Line (DSL) Management Center (DMC) coupled to a DSL network, the DMC comprising:
   a data collection module to receive performance and analysis data from a performance enhancement device coupled to a DSL line at a Customer Premises Equipment (CPE) modem, wherein the performance enhancement device comprises a noise cancellation device;
   an analysis module coupled to the data collection module to analyze the received performance and analysis data and issue a command for the performance enhancement device to optimize operation of the performance enhancement device; and
   a command signal generation module coupled to the analysis module to receive the issued command from the analysis module and generate a corresponding command signal for transmission to the performance enhancement device to cancel noise and interference present on the DSL line.

2. The DMC of claim 1, wherein the performance and analysis data is, or is obtained from, one or more of a modem, a data-to-DSL multiplexer, user preference data, user feedback, operational data, historical data regarding collected operational data, user input regarding DSL network information, a DSL network content delivery system, and higher-layer protocol information from a home network.

3. The DMC of claim 2, wherein the user feedback is provided by an interface on an application device coupled with at least one of a plurality of devices comprising the DMC, the modem, the performance enhancement device, and a controller or input device by which the user can indicate an instantaneous problem.

4. The DMC of claim 3, wherein the real-time user feedback indicates a correlation in time between the user's feedback and operation of the one of the plurality of devices to which the application device's interface is coupled.

5. The DMC of claim 3, wherein the one of the plurality of devices to which the interface of the application device is coupled transmits an acknowledgement that the user's feedback has been received and will be used as the received information in optimizing operation of the one of the plurality of devices.

6. The DMC of claim 1, wherein the DMC reports performance enhancement and/or analysis statistics concerning the DSL lines to a DMC operator and/or to end-users.

7. The DMC of claim 6, further comprising a graphical user interface (GUI) and/or a Northbound Application Programming Interface (NAPI) via which the performance enhancement and/or analysis statistics reports are provided access.

8. The DMC of claim 6, wherein the performance and analysis data is received from the noise cancellation device, and comprises:
   a) information relating to cancellation of different types of noises at the noise cancellation device;
   b) operation of the noise cancellation device; and
   c) noise statistics and observed noise cancellation performance of the noise cancellation device.

9. The DMC of claim 8, wherein the performance and analysis data received from the noise cancellation device includes statistics obtained by one of single-ended loop testing (SELT), double-ended loop testing (DELT), and time-domain reflectometry (TDR).

10. The DMC of claim 6, wherein the performance enhancement and/or analysis statistics reports are based on information provided by at least one of:
    a DMC operator and analyzed by the analysis module, said information comprising a physical inventory of the DSL network including static characterization of a DSL line in the DSL network, a history of the line's characterization, and a location and use of the line;
    an end user and analyzed by the analysis module, said information comprising use and preference to DSL network services and quality, including desired data rates, quality of services for video, audio and data transmission, and time of day usage preferences; and
    a content delivery service, said information comprising motion picture subscription service, streaming video service, internet television service, music subscription service, network gaming or entertainment service, or Voice over Internet Protocol (VoIP) telephony service.

11. The DMC of claim 1, wherein the performance enhancement device communicates with the DMC by way of one or more of the following: analog POTS, cellular data communications, wireless data communications, Broadband Forum TR69, internet data communications, electronic mail communications, flash memory, and DSL communication channels such as Operation, Administration, and Maintenance (OAM) and Embedded Operational Channel (EOC).

12. The DMC of claim 1, wherein the command signal generation module generates the command signal to dynamically adapt at least one of frequency bands and cancellation algorithms corresponding to the performance enhancement device responsive to changes in the received performance and analysis data.

13. In a Digital Subscriber Line (DSL) Management Center (DMC) coupled to a DSL network, a method for enhancing performance of the DSL network, the method comprising:
    receiving performance and analysis data from a performance enhancement device coupled to a DSL line at a Customer Premises Equipment (CPE) modem, wherein the performance enhancement device comprises a noise cancellation device;
    analyzing the received performance and analysis data and issuing a command for the performance enhancement device to optimize operation of the performance enhancement device; and
    generating a command signal corresponding to the command for transmission to the performance enhancement device to cancel noise and interference present on the DSL line.

14. The method of claim 13, the performance and analysis data is, or is obtained from, one or more of a modem, a data-to-DSL multiplexer, user preference data, user feedback, operational data, historical data regarding collected operational data, user input regarding DSL network information, a DSL network content delivery system, and higher-layer protocol information from a home network.

15. The method of claim 14, wherein the user feedback is provided by an interface on an application device coupled with at least one of a plurality of devices comprising the DMC, the modem, the performance enhancement device, and a controller or input device by which the user can indicate an instantaneous problem.

16. The method of claim 15, wherein the real-time user feedback indicates a correlation in time between the user's feedback and operation of the one of the plurality of devices to which the application device's interface is coupled.

17. The method of claim 13, further comprising reporting performance enhancement and/or analysis statistics concerning the DSL lines to a DMC operator and/or to end-users.

18. The method of claim 17, wherein on the performance and analysis data received from the noise cancellation device, said performance and analysis data comprising:
    a) information relating to cancellation of different types of noises at the noise cancellation device;
    b) operation of the noise cancellation device; and
    c) noise statistics and observed noise cancellation performance of the noise cancellation device.

19. The method of claim 17, wherein the performance enhancement and/or analysis statistics reports are based on information provided by at least one of:
    a DMC operator and analyzed, said information comprising a physical inventory of the DSL network including static characterization of a DSL line in the DSL network, a history of the line's characterization, and a location and use of the line;
    an end user and analyzed, said information comprising use and preference to DSL network services and quality, including desired data rates, quality of services for video, audio and data transmission, and time of day usage preferences; and
    a content delivery service, said information comprising motion picture subscription service, streaming video service, internet television service, music subscription service, network gaming or entertainment service, or Voice over Internet Protocol (VoIP) telephony service.

* * * * *